(12) United States Patent
Ilan

(10) Patent No.: US 7,489,631 B2
(45) Date of Patent: Feb. 10, 2009

(54) METHOD AND DEVICE FOR QUALITY MANAGEMENT IN COMMUNICATION NETWORKS

(75) Inventor: Amir Ilan, Hod Hasharon (IL)

(73) Assignee: Veraz Networks Ltd., Petach Tikva (IL)

( * ) Notice: Subject to any disclaimer, the term of this patent is extended or adjusted under 35 U.S.C. 154(b) by 357 days.

(21) Appl. No.: 10/557,578

(22) PCT Filed: Mar. 17, 2005

(86) PCT No.: PCT/IL2005/000308

§ 371 (c)(1),
(2), (4) Date: Nov. 21, 2005

(87) PCT Pub. No.: WO2005/088916

PCT Pub. Date: Sep. 22, 2005

(65) Prior Publication Data

US 2006/0245357 A1      Nov. 2, 2006

(30) Foreign Application Priority Data

Mar. 18, 2004   (IL) ..................................... 160921

(51) Int. Cl.
*G01R 31/08*      (2006.01)
*H04J 3/16*        (2006.01)

(52) U.S. Cl. ................................... 370/230.1; 370/468
(58) Field of Classification Search ................. 370/235, 370/229, 230, 473, 395.21, 395.43, 395.41, 370/468, 230.1, 231–234, 465; 455/452.1, 455/452.2, 453, 450
See application file for complete search history.

(56) References Cited

U.S. PATENT DOCUMENTS 5,506,844 A * 4/1996 Rao ........................... 370/468

(Continued)

FOREIGN PATENT DOCUMENTS

EP            1227624           7/2002

(Continued)

OTHER PUBLICATIONS

IESS-501 (Rev. 2), "Digital Circuit Multiplication Equipment Specification 32 kbit/s ADPCM with DSI and Facsimile Demodulation/Remodulation", 1992, pp. 27-30.

(Continued)

*Primary Examiner*—Kwang B. Yao
*Assistant Examiner*—Candal Elpenord
(74) *Attorney, Agent, or Firm*—Browdy and Neimark, P.L.L.C.

(57) ABSTRACT

A method and apparatus are provided for managing varying traffic loads in a packetized communication network. At a predefined location, the instantaneous demand for bandwidth required for delivering traffic via a plurality of active channels is compared with the available bandwidth. When the available bandwidth at that pre-defined location is less than the bandwidth required to convey the signals carried along all these active channels, a rate adjusting mechanism is applied to at least one of the active channels, while repeating this check periodically. The rate adjusting mechanism is applied on packetized signals arriving along at least one group of active channels so as to ensure that: a substantially equalized signal quality is maintained for signals delivered via all of the active channels belonging to certain one or more groups of active channels, and the instantaneous overall bandwidth required to convey all the signals arriving at the pre-defined location, is not more than the available instantaneous bandwidth.

24 Claims, 4 Drawing Sheets

U.S. PATENT DOCUMENTS

| | | |
|---|---|---|
| 5,745,837 A | 4/1998 | Fuhrmann |
| 5,920,545 A * | 7/1999 | Rasanen et al. .............. 370/232 |
| 6,269,078 B1 | 7/2001 | Lakshman et al. |
| 6,549,515 B1 | 4/2003 | Sourani et al. |
| 6,650,644 B1 | 11/2003 | Colley et al. |
| 6,850,764 B1 * | 2/2005 | Patel ........................... 455/450 |
| 6,978,144 B1 * | 12/2005 | Choksi ..................... 455/452.2 |
| 7,016,409 B2 * | 3/2006 | Unger ................... 375/240.02 |
| 7,046,678 B2 * | 5/2006 | Jiang et al. ............. 370/395.41 |
| 7,068,718 B2 * | 6/2006 | Kim et al. .............. 375/240.02 |
| 2002/0107908 A1 | 8/2002 | Dharanikota |
| 2003/0012137 A1 | 1/2003 | Abdeliliah et al. |
| 2003/0032433 A1 * | 2/2003 | Daniel et al. ................ 455/452 |
| 2003/0084144 A1 * | 5/2003 | Lipinski ..................... 709/224 |

FOREIGN PATENT DOCUMENTS

| | | |
|---|---|---|
| WO | WO 00/57606 | 9/2000 |
| WO | WO 02/15488 A1 | 2/2002 |

OTHER PUBLICATIONS

ITU-T Recommendation G.763, "Digital Circuit Multiplication Equipment Using ADPCM (Recommendation G.726) And Digital Speech Interpolation", Jan. 1994, pp. I-140.

Zhang, T. et al, "Audio Content Analysis for Online Audiovisual Data Segmentation and Classification", vol. 9, No. 4, 2001, pp. 441-457.

Blake, S. et al., "RFC 2475: An architecture for Differentiated Services", Dec. 1998, pp. 1-37.

* cited by examiner

METHOD AND DEVICE FOR QUALITY MANAGEMENT IN COMMUNICATION NETWORKS

FIELD OF THE INVENTION

The present invention relates in general to telecommunication systems and methods for their management, and particularly to systems and methods for efficiently managing packetized communication networks operating under varying traffic loads.

BACKGROUND OF THE INVENTION

The ever-growing traffic load in communication networks has been realized for quite some time as a problem that requires a solution. To date, some solutions were suggested to the problem. One such solution was suggested in IESS-501 (Rev. 3) entitled "Digital Circuit Multiplication Equipment Specification 32 kbit/s ADPCM with DSI and Facsimile Demodulation/Remodulation", 1992. The solution suggested in pp. 27-29 was to decrease the number of bits in the voice channels under overload conditions of the network. When the demand cannot be met by the network, the algorithms will first lose one bit, and then if the demand is still not met, the algorithms may lose a further bit.

Another solution known in the art is a method described in standard G.763 which defines the management of a communication network under varying traffic loads. Essentially, according to this solution a bit is dropped from every algorithm applied in the bearer, and all these dropped bits are collected to a "bank" of bits. When the system load increases, the bits available in the bank can be used. However, if the requirement for bits is further increased and exceeds the number of bits available, each algorithm must "contribute" a further bit to the "bank". The process continues as described above, until the network requirements are met.

As may be appreciated, these solutions are directed to provide a solution to the overload problems and are not particularly concerned with the provision of neither equalized nor maximized signal quality. In other words, the prior art solutions are directed towards ensuring that traffic will be transmitted through the network, even if the transmission is not carried out in the best possible mode.

U.S. Pat. No. 6,549,515 discloses a method for managing varying traffic load in a telecommunication network, by establishing an instantaneous demand for bandwidth, calculating a total number of bits required for conveying transmissions by all active channels, and comparing them with total number of bits required. Thereafter, and applying a bit rate adjusting mechanism for each one of the active channels according to the algorithm used in that channel.

US 20030012137 describes a packet network congestion control system using a biased packet discard policy. Once a connection and session are established, compressed voice and data packets start flowing between the two end points of the path. A control entity supplies congestion control packets periodically. The control packets provide a heartbeat signal to the codec at the other end of the session. Each codec receiver uses the heartbeat signal as an indication of network congestion. As network congestion increases, routers within the network discard excess packets to prevent network failure. The network discards all packets classified as congestion control packets whenever a flow control mechanism detects congestion or a trend toward congestion. As packets are discarded, the end points renegotiate codec type and/or parameters to realize lower bit rates.

WO 0057606 describes a method for discarding data within an IP-network communications link. Initially, the IP-network communications link is monitored to determine the occurrence of an overload condition. At least some of the data packets transmitted along the IP-network communications link are selected in response to detection of the overload condition, and the selected data packets are discarded from the link, while the remainder of the packets are transmitted. According to the method described in that publication, the packet payloads of data packets are separated into important parameters and less important parameters, and the less important parameters are selected and discarded. When packets of real-time flow sessions are concerned, the selected data packets are those having the same source and destination IP addresses and source and destination ports, and consisting of encapsulated video, audio, etc. signals. Discarding these packets from that link allows that only a single or a few real-time flow sessions are eliminated from the link, while the remaining links' sessions are unaffected.

The disclosures of all references mentioned above and throughout the present specification are hereby incorporated herein by reference.

SUMMARY OF THE INVENTION

It is therefore an object of the present invention to provide a method for improving the managing of packetized networks under varying traffic load.

It is yet another object of the present invention to provide a system and an apparatus capable of managing telecommunication traffic load in accordance with the availability of the system resources.

It is a further object of the present invention to provide a method and apparatus for maximizing the quality of signals carried by one or more groups of channels.

It is still another object of the invention to provide a method and an apparatus to provide equalized quality of signals carried by one or more groups of channels.

Other objects of the invention will become apparent as the description of the invention proceeds.

In accordance with an embodiment of the present invention there is provided a method for managing varying traffic loads in a packetized communication network, comprising the steps of:

(i) at a pre-defined location in a packetized communication network, comparing an instantaneous demand for bandwidth required for delivering incoming packetized signals via a plurality of currently active channels, with bandwidth available at that pre-defined location;

(ii) applying a rate adjusting mechanism to at least one of the active channels carrying signals when the available bandwidth at that pre-defined location is less than the bandwidth required for conveying the signals carried along all these active channels; and (iii) repeating steps (i) and (ii) periodically;

wherein the rate adjusting mechanism is applied on packetized signals arriving along at least one group of active channels so as to ensure that:

a. a substantially equalized signal quality is maintained for traffic delivered via all of the active channels belonging to said at least one group of active channels, and b. the instantaneous overall bandwidth required to convey all the packetized signals arriving at the pre-defined location via all active channels, is not more than the instantaneous bandwidth available thereat.

The term substantially equalized quality as used herein, is used to denote signals of the same type wherein the perceived quality in each of the channels is such that the user can hardly distinguish any differences in the signals' quality. For example when the signals are of the voice type, listeners will rank equally the quality of the voice signals. When the signals are of different types, a common scale may be set in accordance with the perception of quality of service for the human user. As should be appreciated, such a substantially equalized quality could either vary or be fixed in time.

A substantially equalized signal quality is associated with one or more groups of channels out of all the active channels carrying traffic reaching that pre-defined location, e.g. a group carrying voice signals. Additionally or in the alternative, different equalized signal quality may be associated with different groups, carrying the same or different type of signals. Additionally or in the alternative, all active channels arriving at the pre-defined location may all belong to the same group, i.e. the same equalized signal quality is associated with to these active channels.

The term "packetized communication network" as will be used hereinafter, should be understood to encompass the various types of networks known in the art, such as synchronous and asynchronous transfer networks, for example ATM networks, Ethernet networks, IP networks, frame relaying networks and the like.

The term "algorithm" as will be used hereinafter, refers to various ways of handling the arriving signals. Such algorithms, typically operative as encoders and/or decoders, encompass signal relaying such as demodulation/remodulation relay or DTMF relay, native data transmission, various types of lossy or lossless compression, variable rate compression, transcoding, silence elimination (0 bit/s), non-compressible clear channel (64 kbit/s), RTP encoder, FEC encoder, T.38 encoder, and the like. The term rate adjusting mechanism as used herein, refers to a mechanism to select an algorithm and an appropriate rate by which to adjust the bandwidth required for the signal operated on.

As will be appreciated by those skilled in the art, the available bandwidth can either be a given fixed value, or in the alternative a congestion measurement/estimation is carried out at the pre-defined location or at a location from which the available bandwidth at the pre-defined location may be estimated, and based on such measurement/estimation, the available bandwidth at the pre-defined location is established.

By still another embodiment of the invention, the transmission method is selected by the rate adjusting mechanism according to the expected impact of the selected transmission method on the quality of the signal, where this selection is made to satisfy the substantially equalized quality required for the group comprising the active channel along which this packet is delivered. In other words, it could well happen that when the rate adjusting mechanism is applied on two different packets, carrying the same type of signal, a certain transmission method will be applied on one of the packets while another transmission method on the other, as long as it is ensured that the resulting quality of the signals in both packets will be substantially equal. Examples to such cases can be dependency on the context of two video packets, dependency on speech phonemes or utterances contained in two voice packets, etc. Suppose that one of the packets carries such information that its distortion by selecting a reduced bandwidth transmission method will cause a severe degradation of the perceived quality of the signal, while the other packet does not. In such a case, one of the possible decisions that may be taken is, that the transmission method applied on the first packet would be such that the signal will be subjected to a minimal distortion (or in other words it will be subjected to minimal reduction of bandwidth), whereas the transmission method that would be applied on the other packet, can be such that would substantially reduce the bandwidth required for the transmission of that other packet.

In accordance with a preferred embodiment of the invention, the rate adjusting mechanism is operative in accordance with the available resources. Such resources may include the instantaneous bandwidth available at that pre-defined location as well as allowed delay and available algorithms. In other words, if traffic carried along a certain group is of a type that can sustain more delay than that of another group, that network resource (i.e. delaying that traffic) could be taken into consideration while determining the equalized quality. Also, let us consider a case where that there are a number of groups carrying each the same type of signals. In that case, the rate adjusting mechanism is capable of differentiating between the various groups, so that not all of the groups would be processed at the same way, e.g. depending on the availability of the resources capable of carrying out the various algorithms. Thus, in such a case, it could well be that some of the groups be forwarded to that pre-defined location processed in accordance with one algorithm at a certain rate and quality, while other groups, carrying the very same type of signals, be processed by a different algorithm and hence may be forwarded at a different quality and rate.

According to another embodiment of the present invention, the rate adjusting mechanism is dependent on the type of the transmitted signal. In other words, different mechanisms and/or transmission methods may be applied for example on a multimedia or voice type of signal as opposed to a facsimile signal.

In addition, each of the groups may be associated with a minimum quality value, e.g. according to a Service Level Agreements (SLA) for traffic delivered along all the channels that belong to a certain group, or according to the type of signals as signals of the facsimile type could sustain a lower quality than voice or video signals, hence to a group of channels carrying facsimile signals, the assigned minimum quality value could be lower than these groups of channels carrying voice or video, etc. In addition, the SLA could also have an impact on the rate adjusting mechanism, e.g. for certain pre-defined groups, the rate adjusting mechanism would be applied differently than that in other groups, so as to comply with the requirements set by the respective SLA.

By yet another embodiment of the invention, the rate adjusting mechanism is dependent on the quality of the signal received. In other words, it could well happen that when the rate adjusting mechanism is applied on two packets, carrying the same type of signal, a certain transmission method will be applied on one of the packets while another transmission method on the other. Examples to such cases can be the dependency on the quality of the arriving signal. Suppose that one of the packets was received at a very poor signal quality while the other signal's quality was high. In such a case, one of the possible decisions that may be taken is, that the rate adjusting mechanism will operate on the poor quality packet by discarding the whole packet, while the rate adjusting mechanism applied to the high quality packet, will enable the transfer of the packet without effecting any rate adjustment thereon.

By still another preferred embodiment, the quality of various types of signals is dependent on various corresponding parameters which contribute to the degradation of the signals' quality. For example, when the signal is a voice type of signal, the quality referred to may be not simply the perceived distortion but also depend on other parameters such as the delay associated with the current packet, which might have a rather meaningful impact on the overall conversational quality. In such a case, a decision could be taken to discard a packet irrespective of the distortion of the received signal, or of the signal's distortion resulting from discarding that packet. As will be appreciated, similar decisions can be taken when the packets are of multimedia type packets, video type packets, audio type packets, etc.

According to yet another embodiment of the invention, the rate adjusting mechanism is based on calculating a plurality of signal quality values each determined for a corresponding pre-defined transmission method, where the transmission method should be understood to encompass transmission of a signal on which one or more algorithms are applied at certain applicable rate(s). For example, when a packet arrives, it may be handled by using a number of possible algorithms, and the quality of the signal obtained under each of these algorithms (which are associated with a corresponding resources, preferably—bandwidth), is determined. Preferably, the rate adjusting mechanism is operative to match the signal quality value selected from among the calculated signal quality values and a transmission method associated therewith, in a way that the selection ensures that the bandwidth required by all of said active channels in the group does not exceed the available bandwidth while a substantially equalized quality is provided for all active channels belonging to that group, and while this quality is the maximal quality that can be provided for the group's channels at this point in time. As will be appreciated by those skilled in the art, the actual implementation of the decisions based on the operation of the rate adjusting mechanism, may either be conducted at the same device where the rate adjusting mechanism decisions take place, or in addition or in the alternative, at another device, which receives as an input the transmission policy made elsewhere.

The rate adjusting mechanism is applied when the available bandwidth is different from the bandwidth required. However, as can be appreciated by a man skilled in the art, for practical purposes such a mechanism is applied, when the available bandwidth is substantially different than the required one. Furthermore, convergence methods that can be applied while implementing the rate adjusting mechanism is likely to result with updating the bandwidth be allocated for each active channel in a way that the overall bandwidth will not be exactly equal to the bandwidth available, but based on practical considerations, be less than but essentially close to the bandwidth available.

In accordance with still another aspect of the invention there is provided a method for managing varying traffic loads in a packetized communication network, comprises the following iterative process:

(i) providing an available bandwidth at a pre-defined location of a packetized communication network;

(ii) providing a plurality of groups each comprising at least one active channel, carrying a signal that is destined to be conveyed via that pre-defined location;

(iii) setting an overall minimum quality value for each of said plurality of groups, where said overall minimum quality value is equal to the maximal possible quality for that group;

(iv) for each of the plurality of active channels, selecting an applicable current transmission method wherein the selected transmission method allows to achieve a maximal quality possible for the signal carried along each of the channels;

(v) aggregating the bandwidths associated with each of the currently selected transmission methods and comparing the aggregated value with the value of the available bandwidth;

(vi) in case that the value of aggregated bandwidth is not greater than that of the available bandwidth, signals associated with the various active channels shall be processed in accordance with the corresponding currently selected transmission methods, so as to obtain the maximal substantially equalized quality for these active channels;

(vii) in case that the value of the aggregated bandwidth is greater than that of the available bandwidth, selecting a lower bandwidth transmission method possible for each of the active channels, excluding those channels in which the signal quality value was at the preceding iteration less than the previous minimum overall quality value designated for that group;

(viii) in case that the signal quality in all active channels has reached the corresponding minimum overall quality value designated for the group(s) to which these active channels belong, setting a lowered minimum overall quality value for each of the groups;

(ix) applying reduced bandwidth transmission methods on signals currently carried along the active channels and determining signal quality values associated therewith;

(x) confirming that the signal quality values are not less than the minimum overall quality value designated for the corresponding group, and in the affirmative, defining the last used transmission methods as the currently selected transmission methods for the corresponding active channel and repeat the process from step (v).

The method was described above for a plurality of single channels. However, as was previously explained, these active channels may be divided into a number of groups, each comprising one or more active channels, so that the bandwidth is allocated on a group level and not on the basis on the individual channels. As will be appreciated by those skilled in the art, such method may be applied when different channels are associated with different service levels, i.e. when a high quality of service is assigned to a group of channels, e.g. for multimedia streams, video conferencing, video-on-demand, etc., a relatively higher bandwidth will be allocated to that group than to a similar group of channels with a lower level of service assured.

The method described above provides a way of establishing the algorithms and rates that would provide the substantially equalized quality. However, as would be appreciated by those skilled in the art, other ways and methods for carrying out such an optimization process are known in the art per se, and could be implemented in order to derive such algorithms and rates. These other ways and methods should be understood to be encompassed too by the present invention.

Also, according to another embodiment, to one or more of the groups a first quality value will be assigned, and when that value is reached, that one or more groups of channels will not participate any further in the iterative procedure described above, while the rest of the groups/channels, will.

As can be appreciated by those skilled in the art, the method described hereinabove could be applied not only on signals received in their non-compressed form, but also on signals received in their already compressed (e.g. encoded) form, in which case the signals may either be left in their compressed mode, or be further compressed or transcoded, if so required. Naturally, if the bandwidth available is more than the bandwidth required, a decision may be taken to improve the signal quality by adding protection (adding redundant information to ensure better quality transmission of the signal) or to decompress (or at least partially decompress) such compressed signals. Preferably, the rate adjusting mechanism comprises replacing of at least one transmission method associated with at least one active channel with another appropriate transmission method, in accordance with a pre-defined scheme associated with such at least one transmission method. Also, as would be appreciated by those skilled in the art, replacing of an transmission method with another appropriate transmission method, encompasses using the same algorithm but at different rates.

According to still another embodiment of the present invention, the pre-defined location is a member selected from the group consisting of: a bearer, a switch, a router, and a media gateway.

By yet another embodiment of the invention, the rate adjusting mechanism comprises applying a transmission method on a packetized signal received at at least one of the active channels, which transmission method is a member selected from the group consisting of: PCM, ADPCM, CS-ACELP, LD-CELP, MPNLQ, ACELP, AMR, EVRC, SMV, QCELP, VBD Relay, FEC/no FEC, RTP encoder/decoder, T.38 encoder/decoder, MPEG1, MPEG2, MPEG4, MPEG3, H.264, ILBC, and the like According to another aspect of the invention there is provided an apparatus operative in a packetized communication network, capable of managing a varying traffic load and comprising:

I) at least one processor capable of calculating the packetized network local load and determining the allocation of available network resources by the steps of:
  (i) comparing an instantaneous demand for bandwidth required for delivering incoming packetized signals via a plurality of currently active channels, with bandwidth available at that pre-defined location; and
  (ii) applying a rate adjusting mechanism to at least one of the active channels carrying the signals when the available bandwidth at that pre-defined location is less than the bandwidth required for conveying the traffic carried along all these active channels;
    wherein the rate adjusting mechanism is applied on packetized signals arriving along at least one group of active channels so as to ensure that:
    a. a substantially equalized signal quality is maintained for traffic delivered via all of the active channels belonging to said at least one group of active channels, and
    b. the instantaneous overall bandwidth required to convey all the packetized signals arriving at the pre-defined location via all active channels, is not more than the instantaneous bandwidth available thereat;
II) at least one encoding/decoding device;
III) at least one comparator, adapted to compare between a signal received by the apparatus and a encoded form thereof; and
IV) at least one processor adapted to determine quality of a received signal when compressed at at least one compressing rate.

According to another embodiment of the invention, the rate adjusting mechanism is applied on the packetized signals according to the expected impact on their quality, and its application is made so as to satisfy a substantially equalized quality required for the at least one group of active channels carrying the packetized signals.

BRIEF DESCRIPTION OF THE DRAWINGS

The present invention will be understood and appreciated more fully from the following detailed examples taken in conjunction with the drawings, in which.

DETAILED DESCRIPTION OF THE INVENTION

In the modern communication traffic network, a large number of communication channels may simultaneously occupy the full bandwidth available. Examples of such applications may be found in concurrent transmissions of voice channel(s) with or without compression, fax(s), data or any combination thereof, and both in TDM and packetized networks.

As was previously explained, a major problem existing in traffic networks is when the network load exceeds or even approaches the maximum capacity of the bandwidth available. To overcome this problem, the present invention provides a method for adjusting the requirements from the network with bandwidth available resources. The load adjustment allows defining if and how to modify the demand for bandwidth of the different users when the network traffic load increases. For example, under low load packets comprising voice signals may be transmitted in their entirety, whereas when the network traffic load increases, certain packets should be dropped in order not to exceed the allowed bandwidth.

In order to achieve an efficient management of the traffic load while providing best equalized quality of transmission possible, (e.g. when voice signals are transmitted), the present invention provides by this example a novel method of managing the traffic.

Figure 1:
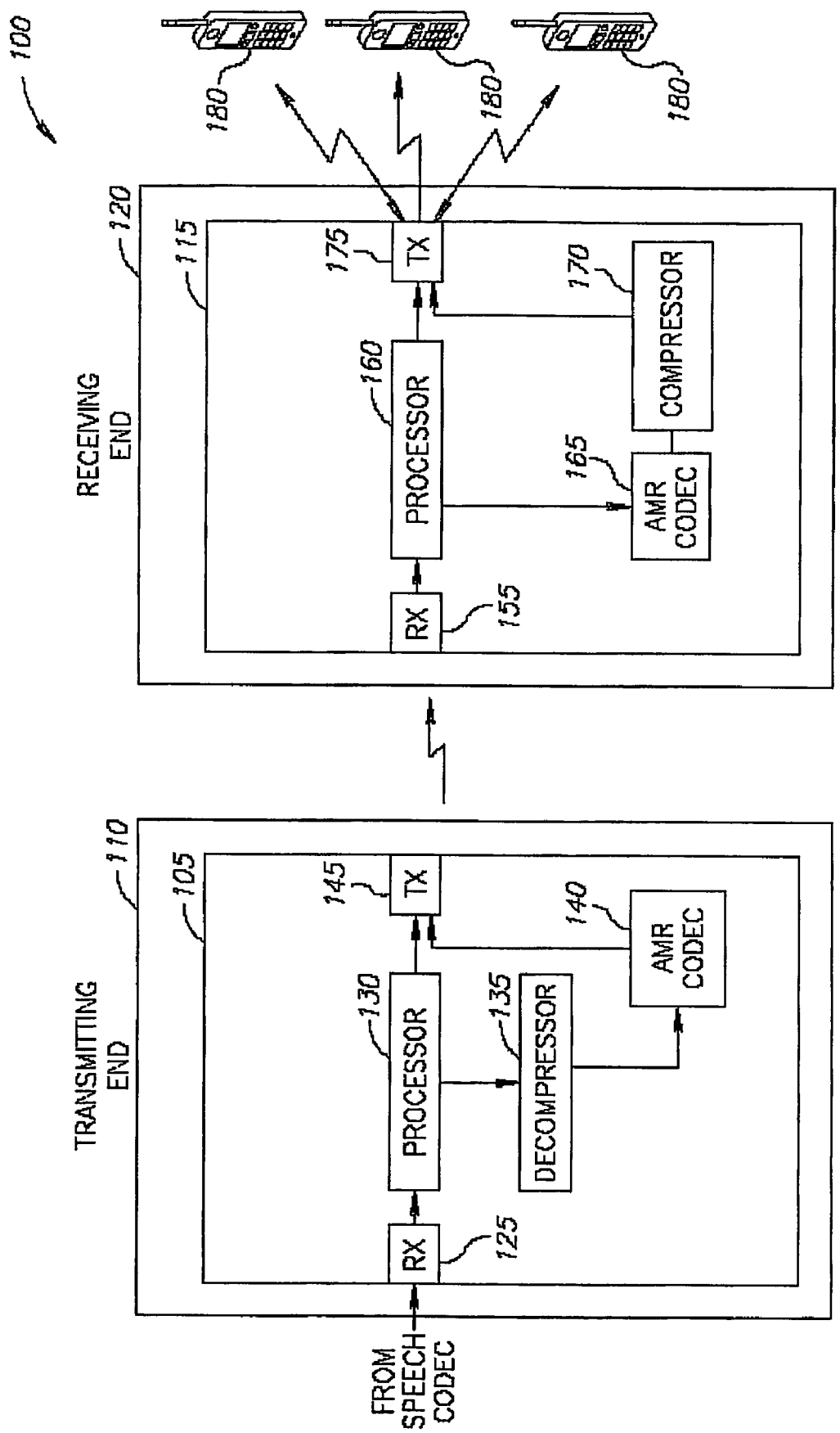
FIG. 1 presents a schematic example of a network operating according to prior art solutions.

Reverting now to FIG. 1, let us consider now as an example, system 1 which comprises a number of encoders (2', 2 and 2') which are used to transmit the signals received thereat in an encoded or un-encoded form to aggregator 6'. The aggregated signal is transmitted in this example in a packetized network 10 along a pre-defined path, 12, which is typically used to ensure quality and time schedule for the transmitted packets. Even if we consider a case whereby path 12 is reserved only for traffic received from aggregator 6', still, at times where the rate of traffic reaching encoders 2', 2 and 2' increases, a congestion problem may arise at the ingress to path 12, which leads, according to the known art to the discarding of packets, to ensure that the bandwidth occupied by the remaining packets shall fit that of path 12. Typically, packets having lower priority will be discarded when congestion increases, while packets having higher priority (e.g. those containing voice signals) will be forwarded.

Let us now consider a case that is somewhat even more problematic than the one described above. In addition to the traffic received from aggregator 6', there is an additional source of traffic, which could be time varying, and the traffic transmitted therefrom should share the same path as the traffic delivered from 6'. In this case the bandwidth available for the traffic delivered by aggregator 6' is varied and dependent of the traffic delivered from that additional source. Let us now assume an even more complex case where path 12 is shared by different users for conveying, in this example, also traffic from encoders 4' and 4 to be aggregated by aggregator 6. Such sharing could either be done by pre-allocating the bandwidth part for traffic received from each one of the aggregators, so that each of these aggregators is responsible to transmit traffic only within that allocation. One of the drawbacks of such a method, is, that one of the aggregator is under congestion, packets will be discarded, having an adverse effect on the quality of the traffic transmitted, while at the same time there is still some unused bandwidth along path 12 due to low usage by the traffic transmitted by the other aggregator.

Figure 2:
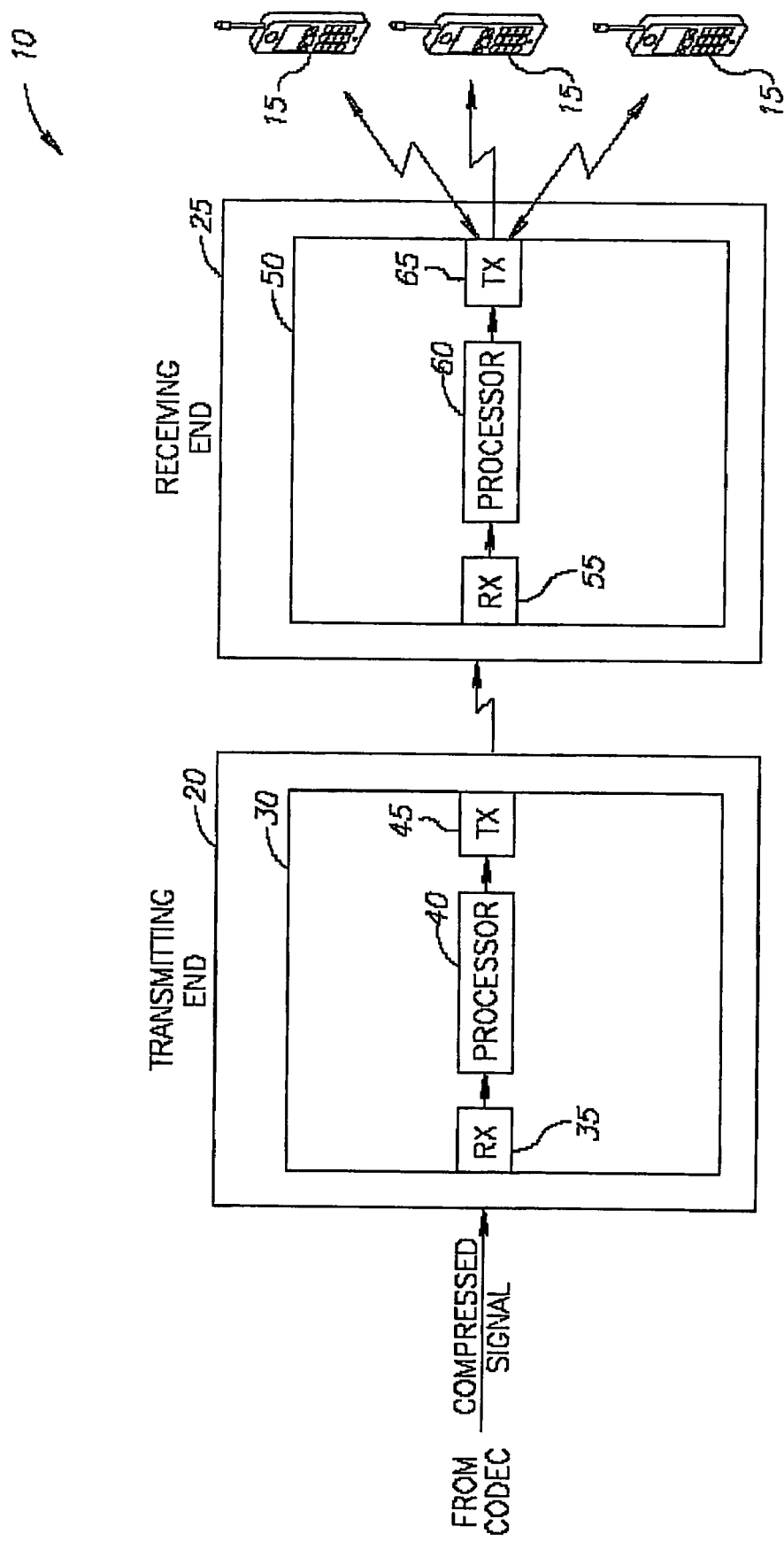
FIG. 2 illustrates an example of a network operating according to an embodiment of the present invention.

According to one of the embodiments of the present invention, illustrated in FIG. 2, a congestion controller 116 is used at the ingress to path 112. This controller is provided with information on the bandwidth allocated to each of the entities that are allowed to transmit packets through path 112 (if applicable) and on the current congestion of path 112. In accordance with this information, it controls the packets that are conveyed along path 112. Typically, the information on the bandwidth allocated to each of the entities that are allowed to transmit packets through path 112 is known and very seldom is changed (depending upon service agreements, etc.). However, the information regarding the instantaneous load has to be frequently received from applicable sources, e.g. entity reporting from the end of path 112, the IP network management, data about traffic transmitted towards aggregators 106' and 106 and comparing it with the bandwidth available, etc. Once a determination is made at congestion controller 116 that the bandwidth available is not sufficient for the traffic to be transmitted, the controller takes the necessary steps to decrease the traffic rate by matching the algorithms used by the encoders, e.g. by discarding packets and/or by discarding bits thereof, in accordance with pre-defined congestion relieving schemes, as will be further explained.

In addition, or in the alternative, a substantially equalized quality can be achieved for all active channels that carry traffic and wherein these channels are aggregated in groups by a plurality of aggregators. By this embodiment, the method provided by the invention to obtain the required substantially equalized quality is applied similarly to that described above for establishing a substantially equalized quality for all groups associated with a single aggregator, mutates mutandis.

As will be appreciated by those skilled in the art, a somewhat similar problem may arise also when a single aggregator is used and the allocation of the bandwidth to the various active channels is done on a statistical basis, which could lead to a scenario whereby the aggregated instantaneous requirements for bandwidth exceed the bandwidth available.

Figure 3:
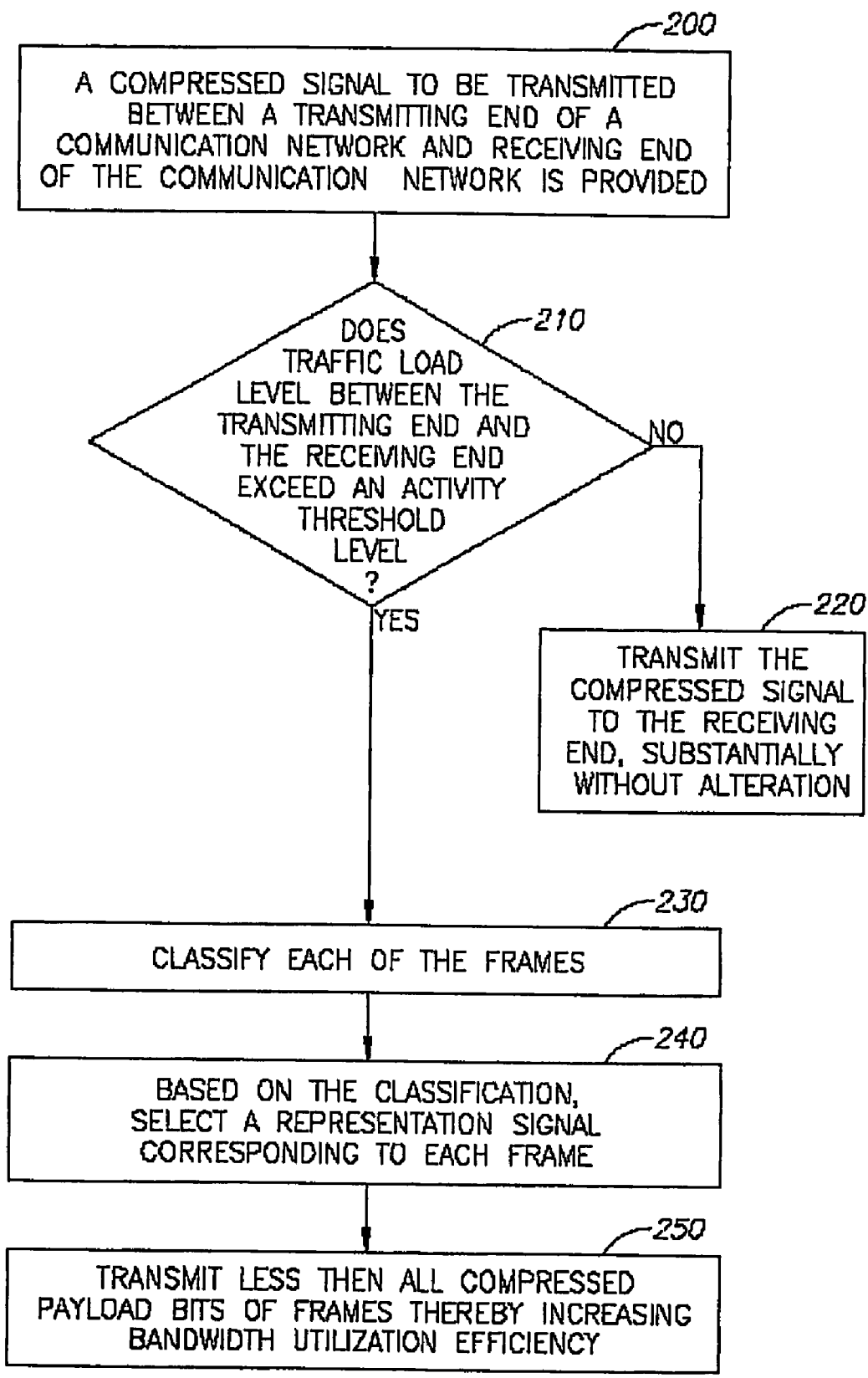
FIG. 3 illustrate a detailed block diagram of an apparatus constructed in accordance with an embodiment of the invention.

FIG. 3 illustrates a schematic representation of a multi-rate encoder 202 constructed and operative in accordance with an embodiment of the present invention.

Before arriving at the encoder, the packet to be transmitted is classified by signal classifier 200, to establish the type of the signal carried by that packet. The signal is classified and its type is determined, e.g. a voice signal, a facsimile signal, a modem signal, a data signal, a DTMF signal, video signal, etc. In accordance with the signal's type, the packet is diverted to the appropriate multiple algorithms/rate encoder (compressor), if applicable. Let us assume now that the packet arriving carries a voice type of signal. The packet is forwarded to multiple algorithm/rate encoder 202 where it is replicated at a number of encoders 203', 203, 203', and preferably a zero bit encoder (frame discarding device 203 and/or silence suppressor 203'), each adapted to operate on that packet at a transmission method different than the others. Each of these encoders' outputs is forwarded through the corresponding decoders (206', 206, 206', 206, 206') and then to the appropriate comparator (208', 208, 208, 208, 208') where each of the differently processed copy of the signal is compared with the original signal received, and the quality rank of the signal as encoded by each of the encoders, is assigned. These quality ranks are then forwarded to a decision-making processor 210, where a matrix matching a quality rank with the transmission method, can be prepared. In addition, the transmission method could be evaluated by the decision making processor and/or the various comparators, to determine its effect on the quality of the related signal.

The data received is collected and processed, and a quality function, which may depend upon one or more of the above-mentioned parameters, is established. Preferably, this function is a multi-dimensional function (e.g. a three dimensional function), which matches a quality value for each pair of a transmission method and a delay parameter. In other words, an array is formed wherein for each given pair of transmission method (typically, the rate values are taken as those of the various 203 encoders) and delay values, there is a matching quality value that represents the quality of the packet that was processed at the corresponding rate and by the corresponding algorithm.

In addition, decision making processor 210, receives inputs such as information that relates to the current load at the aggregator to which that packet is destined, and/or about the delay already incurred by previous packets, and/or the delay from the preceding packet of that signal.

The next step now is how to select the appropriate quality value for each of the channels arriving to the aggregator, in a way that the traffic transmitted via each of the channels shall have essentially the same quality. Or in other words the appropriate transmission method and delay associated with that quality for each of the channels, so that when that are all taken together the load conditions (and/or any other relevant constrains) at the aggregator shall be satisfied. As will be appreciated by those skilled in the art, various methods may be applied for such application. One such method is to select a value that will satisfy the following equation:

$$BW_A(t) \geq \sum_{i=1}^{NoC} (BW_R(i, Q_i(S_i(t), TM_i(t)\ delay_i(t))\Big|_{Q_i \geq MRQ}$$

where:

$BW_A(t)$ is the available bandwidth at a given time;

i is the channel index number;

NoC is the total number of channels which carry traffic that should be transmitted via the aggregator;

$BW_R$ is the requested bandwidth for transmitting the current traffic of channel i at time t and at quality $Q_i$;

$S_i(t)$ is the signal in a channel i which relates to the transmitted packet at time t;

$TM_i(t)$ is the transmission method applied in channel i on the packet transmitted at time t;

$delay_i(t)$ is the accumulated delay associated with packet at time t in channel i;

$Q_i$ is the instantaneous quality of the signal (packet) transmitted in channel i at time t, at a given accumulated delay and under a given transmission method, resulting in the required bandwidth $BW_R$; and MRQ is the minimum required quality per group of channels to which channel i belongs.

By satisfying this equation, the values of $Q_i$ would preferably be selected to ensure that for each type of signal transmitted in any of the channels, the maximum quality can be achieved, while the overall bandwidth of the traffic that will be transmitted along these channels would still satisfy the current load conditions at the channels' aggregation point.

Figure 4:
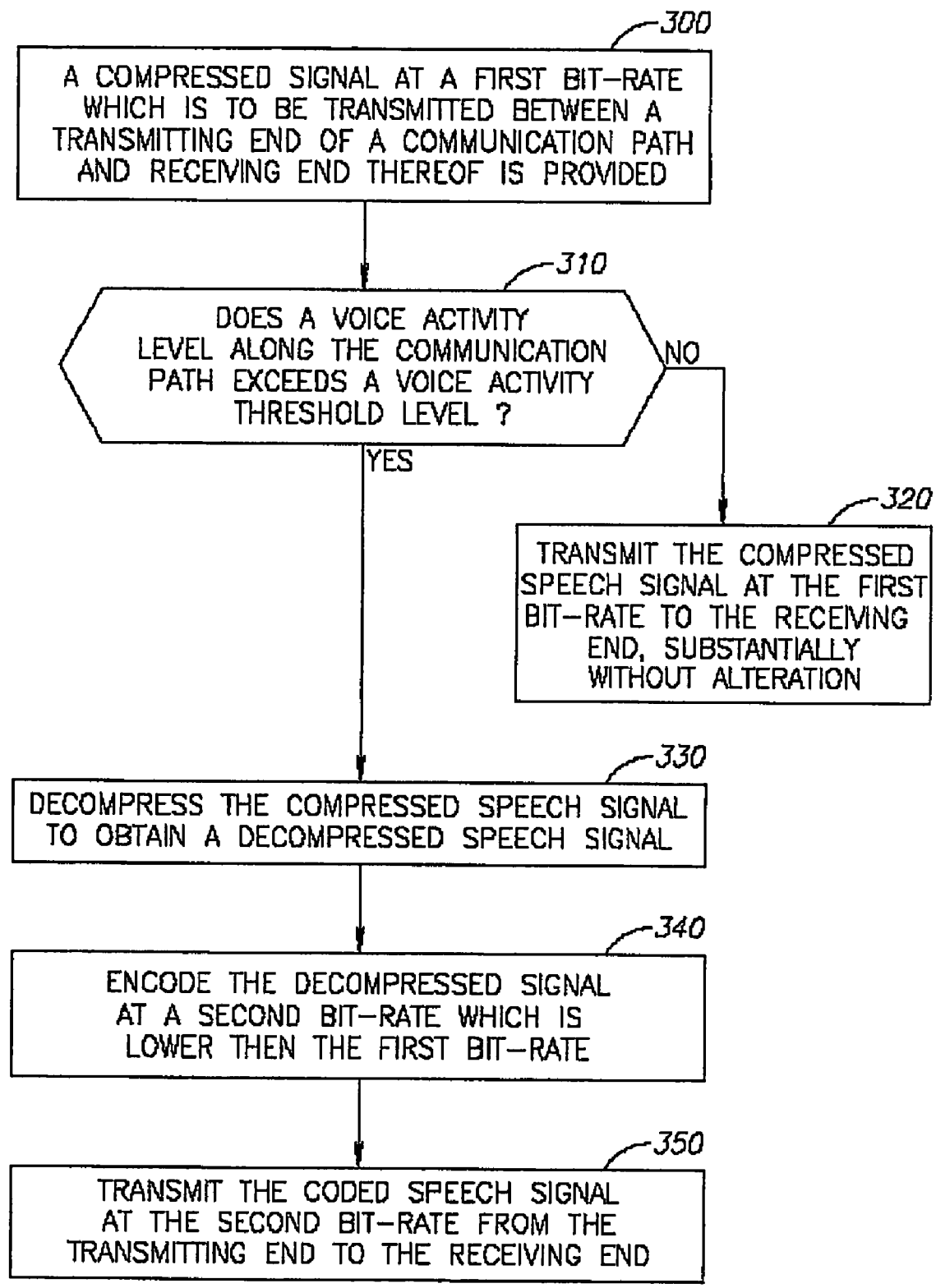
FIG. 4 is a simplified flowchart illustration of a preferred method of operation of the apparatus of FIG. 3.

FIG. 4 is a simplified flowchart illustration of a one of the preferred methods of carrying out the present invention.

By this example, the method comprises the following steps:

Providing a plurality of signals carried along a plurality of active channels (step 400) and setting an overall minimum quality value for the traffic that is carried along all active channels and is due for delivery via a junction point (the pre-defined location) (step 410). Then, (step 420) determining the type of the signal, and the possible transmission method(s) (step 430) at which each of the signals can be forwarded at the pre-defined location. The latter determination is made according to the type of the signal and the available encoders which are suitable to encode such type of a signal.

Next, associating a signal quality rank for each of these possible transmission methods (step 440) and determining the transmission method associated with the overall minimum quality for each of the active channels (step 450). If (step 460) the aggregated bandwidth required for the traffic delivered via all active channels and associated with the overall minimum quality is higher than the available bandwidth, then the overall minimum quality value is reduced (step 470) and the process is repeated once again from step 450. If the aggregated bandwidth required for the traffic delivered via all active channels and associated with the overall minimum quality is not higher than the available bandwidth, then each of the active channels should be encoded by the corresponding currently selected transmission method (step 490). Next, the encoded traffic is transmitted (step 500).

It is to be understood that the above description is only of some embodiments of the invention and serves for its illustration. Numerous other ways of managing load developing in a telecommunication networks may be devised by a person skilled in the art without departing from the scope of the invention, and are thus encompassed by the present invention.

The invention claimed is:

1. A method for managing varying traffic load in a packetized communication network, comprising the steps of:
   (i) at a pre-defined location in a packetized communication network, comparing an instantaneous demand for bandwidth required for delivering incoming packetized signals via a plurality of currently active channels, with bandwidth available at that pre-defined location;
   (ii) applying a rate adjusting mechanism to at least one of the active channels carrying the signals when the available bandwidth at that pre-defined location is less than the bandwidth required for conveying the signals carried along all these active channels, and wherein at least one group of active channels comprises more than one active channel, carrying signals at a substantially equalized quality which is different from a substantially equalized quality of signals associated with a different group of active channels; and
   (iii) repeating steps (i) and (ii) periodically;
   and wherein the rate adjusting mechanism is applied on packetized signals arriving along at least one group of active channels so as to ensure that:
   a. a substantially equalized signal quality is maintained for signals delivered via all of the active channels belonging to said at least one group of active channels, and
   b. the instantaneous overall bandwidth required to convey all the packetized signals arriving at the pre-defined location via all active channels, is not more than the instantaneous bandwidth available thereat.

2. A method according to claim 1, wherein said substantially equalized signal quality is associated with one or more groups of channels out of all the active channels carrying traffic and reaching said pre-defined location.

3. A method according to claim 1 wherein a number of different substantially equalized signal qualities are associated each with a different group of active channels.

4. A method according to claim 3, wherein at least some of said different groups are associated with different type of signals.

5. A method according to claim 1, wherein said rate adjusting mechanism is operative in accordance with available resources in said packetized communication network.

6. A method according to claim 5, wherein said available resources comprise at least one member of the group comprising instantaneous bandwidth available at that predefined location, allowed delay and available algorithms, or any combination thereof.

7. A method according to claim 1, wherein said rate adjusting mechanism is dependent on the type of the transmitted signal.

8. A method according to claim 1, wherein said rate adjusting mechanism is applied on said packetized signals according to the expected impact on their quality, where said rate adjusting mechanism application is made to satisfy a substantially equalized quality required for said at least one group of active channels carrying said packetized signals.

9. A method according to claim 1, wherein each of said at least one group of active channels is associated with a corresponding minimum quality value.

10. A method according to claim 9, wherein said corresponding minimum quality value depends on a member selected from the group comprising: Service Level Agreement concerning traffic transmitted along said at least one group of active channels, type of signals carried by said at least one group of active channels, or a combination thereof.

11. A method according to claim 1, wherein said rate adjusting mechanism is dependent on a quality of the signal received.

12. A method according to claim 1, wherein said rate adjustment mechanism involves calculating a plurality of signal quality values each determined for a corresponding pre-defined transmission method applied on a certain packet.

13. A method according to claim 12, wherein the rate adjustment mechanism is operative to select a transmission method that is associated with a signal quality value which meets the requirement for said substantially equalized quality and selected from among said plurality of signal quality values.

14. A method according to claim 1, wherein said rate adjustment mechanism applied for each of the active channels comprises calculating a plurality of signal quality values, each of which correspond to a certain transmission method, and establishing for which of the transmission methods, the corresponding signal quality value is not less than a substantially equalized quality set for signals arriving at said pre-defined location.

15. A method for managing varying traffic load in a plurality of groups, each comprising at least one active channel carrying traffic via a pre-defined location, which method comprises the steps of:
 (i) providing an available bandwidth at a pre-defined location of a packetized communication network;
 (ii) providing a plurality of groups each comprising at least one active channel, carrying a signal that is destined to be conveyed via that pre-defined location;
 (iii) setting an overall minimum quality value for each of said plurality of groups, where said overall minimum quality value is equal to the maximal possible quality for that group;
 (iv) for each of said plurality of active channels, selecting an applicable current transmission method wherein the selected transmission method allows to achieve a maximal quality possible for the signal carried along each of said channels;
 (v) aggregating the bandwidths associated with each of the currently selected transmission methods and comparing the aggregated value with the value of the available bandwidth;
 (vi) in case that the value of aggregated bandwidth is not greater than that of the available bandwidth, processing signals associated with the various active channels in accordance with the corresponding currently selected transmission methods, so as to obtain the maximal substantially equalized quality for these active channels;
 (vii) in case that the value of the aggregated bandwidth is greater than that of the available bandwidth, selecting a lower bandwidth transmission method possible for each of the active channels, excluding those channels in which the signal quality value was at a preceding iteration less than a minimum overall quality value designated for that group;
 (viii) in case that the signal quality in all active channels has reached the corresponding minimum overall quality value designated for the group(s) to which these active channels belong, setting a lowered minimum overall quality value for each of the groups;
 (ix) applying reduced bandwidth transmission methods on signals currently carried along the active channels and determining signal quality values associated therewith;
 (x) confirming that the signal quality values are not less than the minimum overall quality value designated for the corresponding group, and if affirmative, defining the last used transmission methods as the currently selected transmission methods for the corresponding active channel and repeat the process from step (v).

16. A method according to claim 15, further comprising assigning a first quality value to at least one of said groups and when the overall minimum quality value is equal or less than said first quality value, encoding the traffic to be carried along that at least one group by the appropriate encoders selected in the preceding iterative step.

17. A method according to claim 1, wherein signals are received at at least along one of said active channels already in their encoded form.

18. A method according to claim 17, and further comprising transcoding said already encoded signals.

19. A method according to claim 1, further comprising a step of improving signals quality by adding protection to the transmitted packets or at least partially decoding signals received in their encoded form if the bandwidth available is greater than the required bandwidth.

20. A method according to claim 1, wherein said rate adjusting mechanism comprises applying a transmission method on a packetized signal received at at least one of the active channels, which transmission method is a member selected from the group consisting of: PCM, ADPCM, CS-ACELP, LD-CELP, MPNLQ, ACELP, AMR, EVRC, SMV, QCELP, VBD Relay, FEC/no FEC, MPEG1, MPEG2, MPEG4, MPEG3, ILBC, H.264, RTP encoder/decoder, T.38 encoder/decoder and their various respective rates.

21. A method according to claim 1, wherein said equalized signal quality is determined based upon signal distortion, a delay associated with said signal or any weighted combination thereof.

22. An apparatus operative in a packetized communication network, capable of managing a varying traffic load and comprising:
 (I) at least one processor capable of calculating the packetized network local load and determining the allocation of available network resources by the steps of:
  (i) comparing an instantaneous demand for bandwidth required for delivering incoming packetized signals via a plurality of currently active channels, with bandwidth available at that pre-defined location, and wherein the active channels are divided into a plurality of groups and at least one of said plurality of groups comprises more than one active channels; and
  (ii) applying a rate adjusting mechanism to at least said at least one of the plurality of groups that comprises more than one active channels carrying the signals when the available bandwidth at that pre-defined location is less than the bandwidth required for conveying the signals carried along all these active channels;
  wherein the rate adjusting mechanism is applied on packetized signals arriving along at least one group of active channels so as to ensure that:
   a. a substantially equalized signal quality is maintained for signals delivered via all of the active channels belonging to said at least one group of active channels and wherein the substantially equalized signal quality of said at least one group is different from a substantially equalized signal quality maintained for signals delivered via a different group of one or more active channels; and
   b. the instantaneous overall bandwidth required to convey all the packetized signals arriving at the pre-defined location via all active channels, is not more than the instantaneous bandwidth available thereat;
 II) at least one encoding/decoding device;
 III) at least one comparator, adapted to compare between a signal received by the apparatus and a compressed form thereof; and
 IV) at least one processor adapted to determine quality of a received signal when compressed at at least one compressing rate.

23. Apparatus according to claim 22, wherein said rate adjusting mechanism is applied on said packetized signals according to the expected impact on their quality, where said rate adjusting mechanism application is made to satisfy a substantially equalized quality required for said at least one group of active channels carrying said packetized signals.

24. A system operative in a packetized communication network, capable of managing a varying traffic load and wherein said system comprises:
 at least one apparatus of claim 23, and
 at least one controller adapted to determined the available bandwidth at said pre-defined location, and update said at least one apparatus accordingly.

* * * * *